(No Model.)

J. KUEFFER.
AUTOMATIC OPERATING MECHANISM FOR STATION INDICATORS.

No. 464,941. Patented Dec. 8, 1891.

Fig. 3ª

Witnesses:  Inventor:

UNITED STATES PATENT OFFICE.

JOHN KUEFFER, OF SAN FRANCISCO, CALIFORNIA, ASSIGNOR TO THE AMERICAN INDICATOR AND IMPROVEMENT COMPANY, OF SAME PLACE.

AUTOMATIC OPERATING MECHANISM FOR STATION-INDICATORS.

SPECIFICATION forming part of Letters Patent No. 464,941, dated December 8, 1891.

Application filed February 13, 1891. Serial No. 381,285. (No model.)

*To all whom it may concern:*

Be it known that I, JOHN KUEFFER, a citizen of the United States, residing in the city and county of San Francisco, State of California, have invented certain new and useful Improvements in Automatic Mechanism for Operating Station-Indicators, of which the following is a specification.

My invention relates to improvements in automatic mechanism for working a street or station indicator in a railway-car by or from stops or projections fixed on the roadway; and it consists in certain novel construction and combination of parts as hereinafter set forth.

Figure 1:
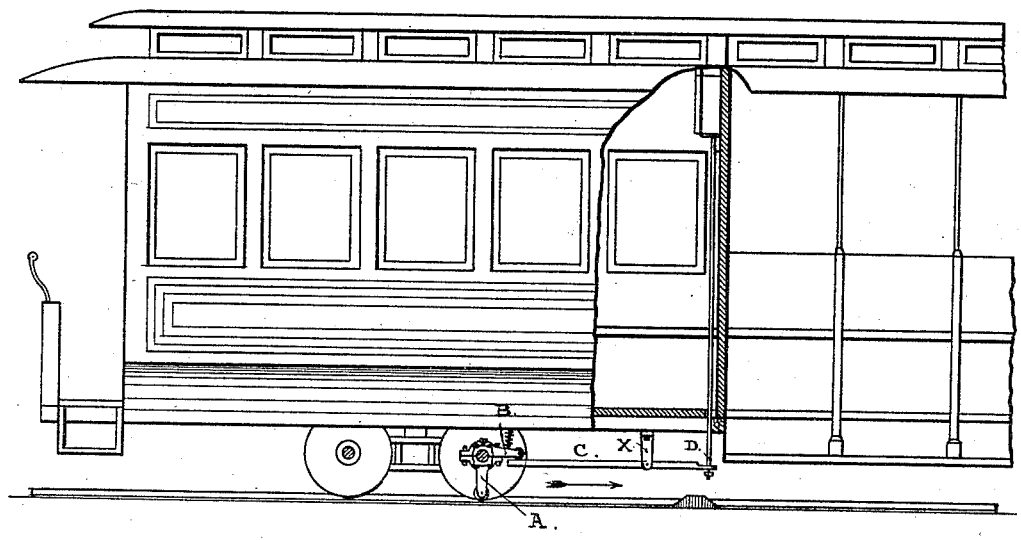
Figure 2:
Figure 3:
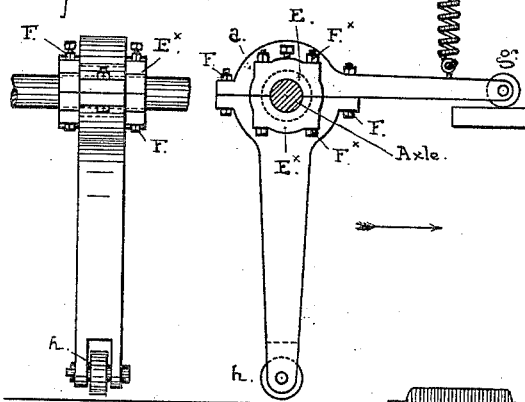
Figure 3:
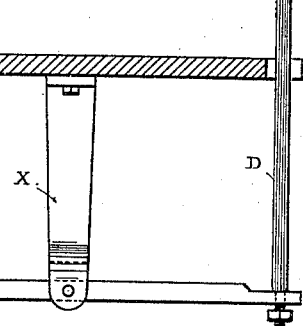

Figure 1 of the accompanying drawings, which form part of this specification, represents the mechanism in position on the car-truck and connected with the indicator-box in the car. Fig. 2 is a side view of the parts on an enlarged scale. Fig. 3 is a view of the depending lever from the rear or from the left-hand side of Fig. 2. Fig. 3ª is a detail view of the bushing.

This improvement consists in a novel construction of rocking arm or lever in separable parts to be set in position on one of the axles of a car-truck and having a perpendicular depending arm or member to engage with fixed stops or projections on the roadway, and a horizontally-extending arm to rest on and act against a lever that is connected to an upright push-rod, which is itself connected to the mechanism of the indicator-box to work the same.

The object of the present improvement in mechanism of this class is to simplify the parts, to render them easy of application to any style of car-truck or running-gear, and especially to insure positive and fixed relation of the actuating-lever to the stops on the surface of the track, so that the movements of the car-body on the truck shall not affect the position of the end of this lever with reference to the fixed stops or projections of the surface of the roadway.

A indicates the perpendicularly-depending arm or lever, B the horizontally-extending arm, and C the lever which is acted on by the arm B and acts in turn upon the upright push-rod D. The adjacent ends of the two parts A B, when joined together, form a hub $a$, with a central circular opening, which is of suitable diameter to fit an axle, sleeve, or bushing E on the axle. The two parts are united by bolts F F taking through ears or flanges $a$, and the bushing is split diametrically and is provided with collars or enlarged ends $E^\times$. This part E is placed over the axle to take the wear and is held and confined by the hub of the rocking lever when the joint of that part is drawn together by the screw fastenings, or the two halves of the bushing may be fastened by bolts $F^\times F^\times$, as shown in Figs. 2 and 3ª.

The lower end of the arm A is slotted for a friction wheel or roller $h$, and the end of the horizontal arm is likewise furnished with a friction-roller to bear on the lever $g$. This last-mentioned lever is fulcrumed in a bracket X, fastened against the bottom of the car, and the end on the opposite side of the fulcrum opposite to the arm B is connected to the push-rod D of the indicator-box. This rod is carried upward through the car to the box above where it is attached to the mechanism that moves the name-bearing drum or cylinder after the usual manner of working indicators of this character in the upper part of the car by a push-rod extending down through the car to the actuating mechanism beneath.

Having thus fully described my invention, what I claim, and desire to secure by Letters Patent, is—

In automatic indicator-operating mechanism, the combination of a bell-crank lever the limbs of which are separable and each provided with the half of a split hub and adapted to be united over a shaft or axle, each of said limbs carrying a roller on its end, one of which rides close to the surface of the track, and a pivoted lever C, to one end of which the push-rod is connected and upon the opposite end the roller in the horizontal limb of the bell-crank lever rides, as set forth.

In testimony that I claim the foregoing I have hereunto set my hand and seal.

JOHN KUEFFER. [L. S.]

Witnesses:
EDWARD E. OSBON,
A. M. CHARLOT.